United States Patent
Sato

(10) Patent No.: US 9,928,863 B2
(45) Date of Patent: Mar. 27, 2018

(54) MAGNETIC DISK DEVICE AND CONTROL METHOD THEREOF

(71) Applicant: KABUSHIKI KAISHA TOSHIBA, Tokyo (JP)

(72) Inventor: Hiroaki Sato, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/449,373

(22) Filed: Mar. 3, 2017

(65) Prior Publication Data

US 2018/0061444 A1 Mar. 1, 2018

(30) Foreign Application Priority Data

Aug. 23, 2016 (JP) ................. 2016-162827

(51) Int. Cl.
*G11B 5/33* (2006.01)
*G11B 5/60* (2006.01)

(52) U.S. Cl.
CPC ............ *G11B 5/607* (2013.01); *G11B 5/6076* (2013.01)

(58) Field of Classification Search
CPC ....... G11B 5/6005; G11B 5/02; G11B 5/6076; G11B 5/3133; G11B 5/3143; G11B 5/607; G11B 5/11; G11B 5/6082; G11B 5/4866; G11B 2005/0021; G11B 2005/0005; G11B 5/4907; G11B 5/2352; G11B 5/332

USPC ......... 360/59, 75, 125.31, 125.74, 313, 328; 369/13.13, 13.33, 13.32

See application file for complete search history.

(56) References Cited

U.S. PATENT DOCUMENTS

| 8,749,920 B1 | 6/2014 | Knutson et al. | |
| 2012/0099218 A1 | 4/2012 | Kurita et al. | |
| 2012/0300334 A1* | 11/2012 | Hsiao | G11B 5/607 360/59 |
| 2016/0293194 A1* | 10/2016 | Contreras | G11B 5/607 |

FOREIGN PATENT DOCUMENTS

JP 2009-129532 A 6/2009

* cited by examiner

*Primary Examiner* — Nabil Hindi
(74) *Attorney, Agent, or Firm* — Patterson & Sheridan, LLP

(57) ABSTRACT

A magnetic disk device includes a magnetic disk, a head slider and a control circuit. The head slider includes a read element, a write element, a first heater and a second heater. The first heater is arranged nearer to the read element than the write element. The second heater is arranged nearer to the write element than to the read element. The control circuit controls a ratio of powers to be supplied to the first heater and the second heater to adjust a first spacing between the read element and the magnetic disk and a second spacing between the write element and the magnetic disk.

18 Claims, 9 Drawing Sheets

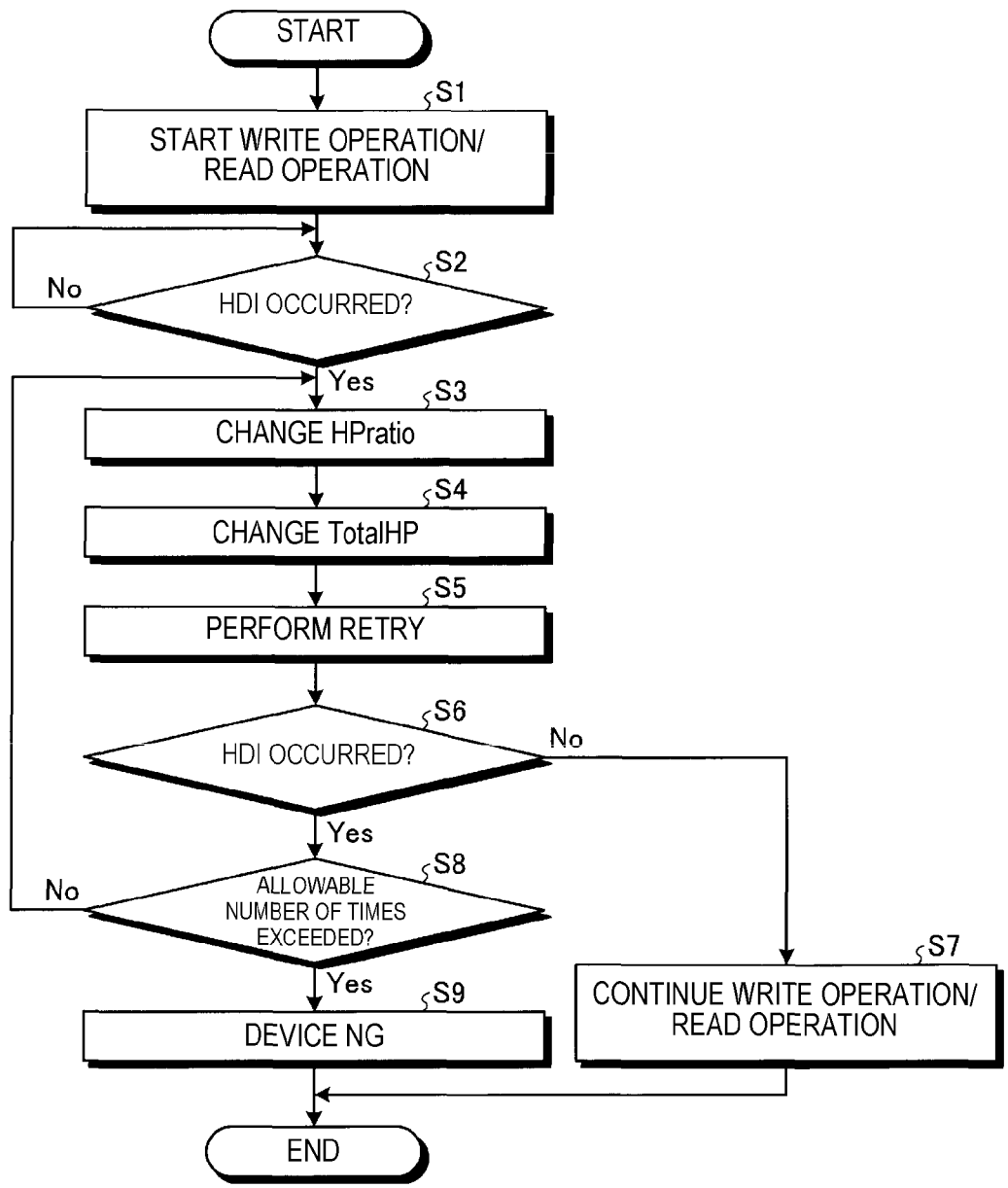

US 9,928,863 B2

MAGNETIC DISK DEVICE AND CONTROL METHOD THEREOF

CROSS-REFERENCE TO RELATED APPLICATION

This application is based upon and claims the benefit of priority from Japanese Patent Application No. 2016-162827, filed Aug. 23, 2016, the entire contents of which are incorporated herein by reference.

FIELD

Embodiments described herein relate generally to a magnetic disk device and a control method thereof.

BACKGROUND

A dynamic fly height (DFH) control is performed in a magnetic disk device by using a heater mounted on a head slider. The heater is energized to cause the head slider to be thermally expanded, as a result of which a spacing of the head slider from a magnetic disk can be adjusted.

DESCRIPTION OF THE DRAWINGS

FIG. 11 is a flow chart illustrating an operation of the magnetic disk device according to the embodiment.

DETAILED DESCRIPTION

According to one embodiment, there is provided a magnetic disk device and a control method thereof, which are capable of stabilizing the performance of the magnetic disk device.

According to one embodiment, a magnetic disk device includes a magnetic disk, a head slider, and a control circuit. The head slider includes a read element, a write element, a first heater, and a second heater. The first heater is arranged nearer to the read element than the write element. The second heater is arranged nearer to the write element than to the read element. The control circuit controls a ratio of powers to be supplied to the first heater and the second heater to adjust a first spacing between the read element and the magnetic disk and a second spacing between the write element and the magnetic disk.

Hereinafter, a magnetic disk device according to an example embodiment will be described in detail with reference to the accompanying drawings. It is, however, noted that the present disclosure is not limited to the disclosed example embodiment.

Example Embodiment

Figure 1:
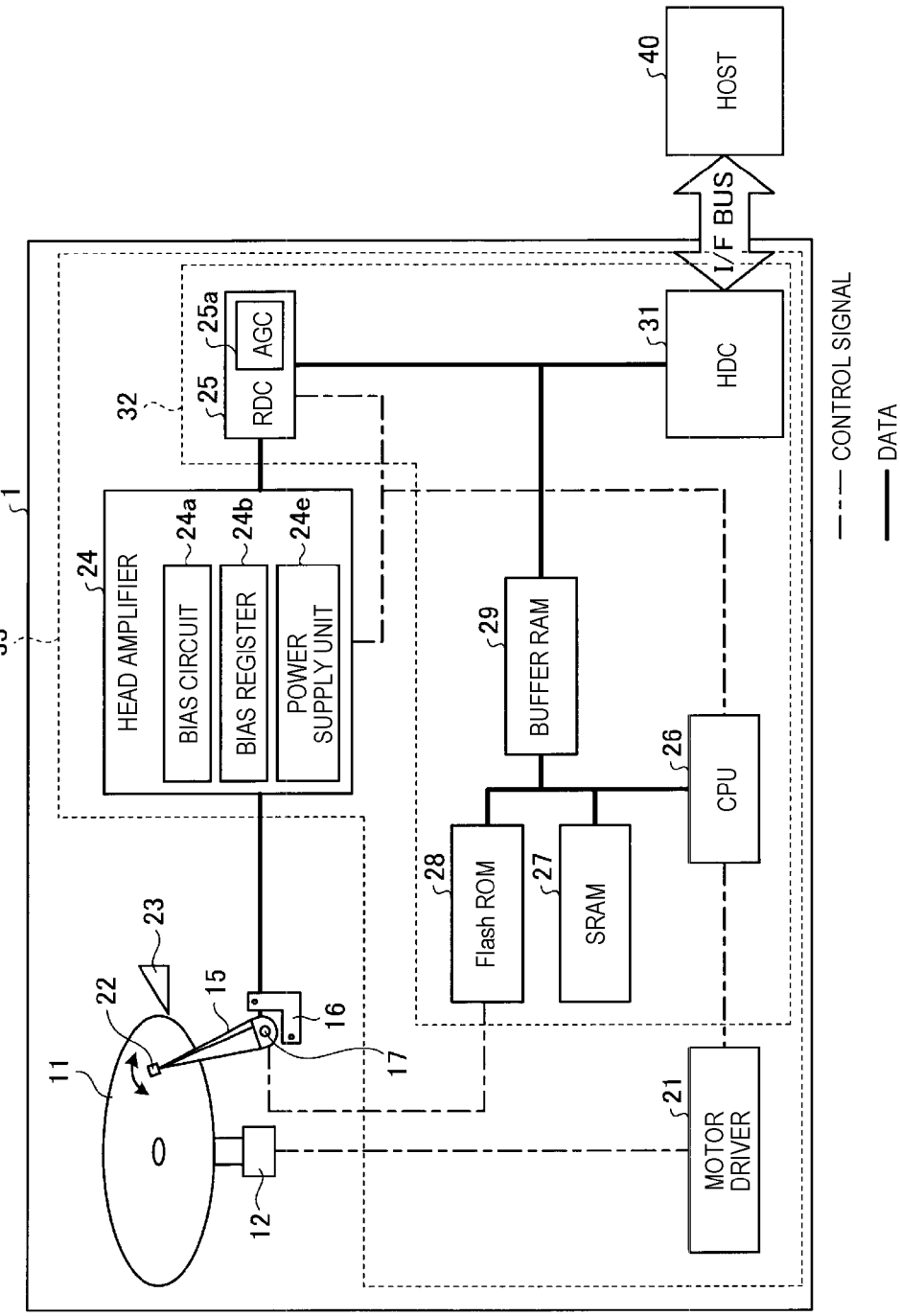
FIG. 1 is a block diagram illustrating a configuration of a magnetic disk device according to an embodiment.

A magnetic disk device according to an embodiment will be described with reference to FIG. 1. FIG. 1 is a view illustrating a configuration of a magnetic disk device 1.

The magnetic disk device 1 is, e.g., a hard disk drive and functions as an external storage device for a host 40.

Specifically, the magnetic disk device 1 includes a magnetic disk 11, a spindle motor 12, a head slider 22, an actuator arm 15, a voice coil motor (VCM) 16, a ramp 23, and a control unit 33. The magnetic disk 11, the spindle motor 12, the head slider 22, the actuator arm 15, the voice coil motor (VCM) 16, the ramp 23 and a portion of the control unit 33 are accommodated in a housing (not illustrated). The other portion of the control unit 33 is provided on a board (outside the housing).

The control unit 33 includes a head amplifier 24, a motor driver 21, and a controller 32. The head amplifier 24 includes a bias circuit 24a, a bias register 24b, and a power supply unit 24e. The controller 32 includes a read/write channel (RDC) 25, a hard disk controller (HDC) 31, a CPU 26, an SRAM 27, a flash ROM 28, and a buffer RAM 29.

In addition, a package of the head amplifier 24 may be provided on a board fixed to the actuator arm 15. The controller 32 may be configured with a one-chip integrated circuit (system-on-chip). A package of the controller may be provided on a printed circuit board outside the housing.

The magnetic disk 11 is a disk-shaped recording medium for magnetically recording a variety of information and is rotated by the spindle motor 12. The magnetic disk has a plurality of concentric tracks or a one-line spiral track centered on the vicinity of the rotational center of the spindle motor 12. A plurality of data areas DT and servo areas SV are alternately formed in a circumferential direction in each track.

The actuator arm 15 is rotatably attached to a pivot 17. The head slider 22 is attached to one end of the actuator arm 15. The VCM 16 is connected to the other end of the actuator arm 15. The VCM 16 rotates the actuator arm 15 around the pivot 17 and positions the head slider 22 in a floating state above any radial spot of the magnetic disk 11. At this time, The CPU 26 performs a servo control for positioning of the head slider 22 (positioning control) using a servo signal (servo information), which is read by a reader (see FIG. 2) in the head slider 22 from a servo area SV (see FIG. 6).

According to a command from the CPU 26, the motor driver 21 drives the spindle motor 12 to rotate the magnetic disk 11 at a predetermined rotation speed around a shaft of the spindle motor 12. In addition, according to a command from the CPU 26, the motor driver 21 drives the VCM 16 to move the head slider 22 attached to the one end of the actuator arm 15 in the radial direction of the magnetic disk 11.

Figure 2:
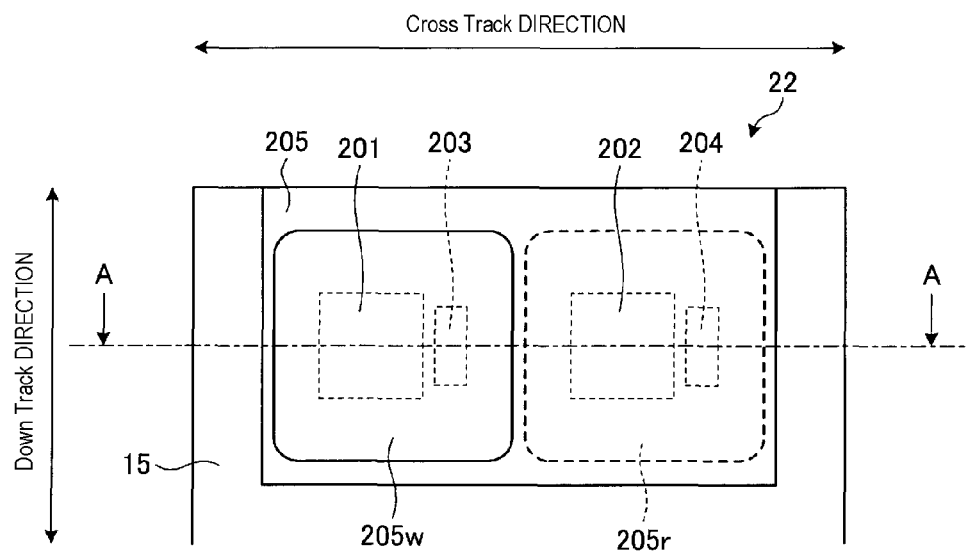
FIG. 2 is a plan view illustrating a configuration of a head slider in the embodiment.
Figure 3:
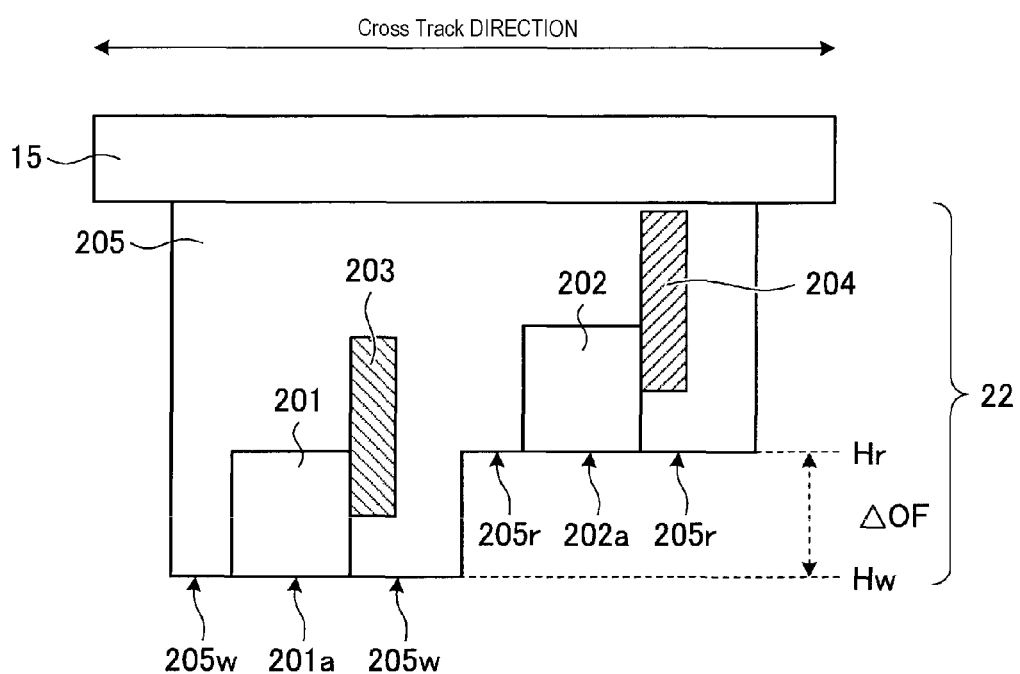
FIG. 3 is a sectional view illustrating the configuration of the head slider in the embodiment.

The head slider 22 writes user data in the magnetic disk 11 or reads information (user data and servo information) recorded in the magnetic disk 11. The head slider 22 has, e.g., a configuration illustrated in FIGS. 2 and 3. FIG. 2 is a plan view illustrating the configuration of the head slider 22 when viewed from the recording surface side of the magnetic disk 11. FIG. 3 is a sectional view illustrating the configuration of the head slider 22, which is taken along line A-A in FIG. 2.

As illustrated in FIGS. 2 and 3, the head slider 22 employs a dual heater structure, and includes a slider 205 in which a writer 201 (or write head), a reader (or read head) 202, a writer heater 203, and a reader heater 204 are provided.

The writer 201 faces the magnetic disk 11. The writer 201 writes data in the data areas DT of the magnetic disk 11 by a magnetic field generated from magnetic poles of the writer 201. The reader 202 faces the magnetic disk 11. The reader 202 reads the information (user data and servo information) recorded in the magnetic disk 11 by reading a change in magnetic field on the magnetic disk 11 as data. In addition, for example, when the rotation of the magnetic disk 11 is stopped, the head slider 22 is retracted onto the ramp 23 (see FIG. 1).

The writer heater 203 is arranged in the vicinity of the writer 201. The reader heater 204 is arranged in the vicinity of the reader 202. When the electrical conduction of both of the writer heater 203 and the reader heater 204 is turned off, a leading edge 201a of the writer 201 in the magnetic disk 11 side is located closer to the magnetic disk 11 than a leading edge 202a of the reader 202 in the magnetic disk 11 side, as illustrated in FIG. 3. In FIG. 3, a difference between a reference height position Hr of the reader 202 and a reference height position Hw of the writer 201 is denoted by a reference offset ΔOF. The reference height position Hr is a height position of the leading edge 202a of the reader 202 when the electrical conduction of both of the writer heater 203 and the reader heater 204 is turned off. The reference height position Hw is a height position of the leading edge 201a of the writer 201 when the electrical conduction of both of the writer heater 203 and the reader heater 204 is turned off.

At this time, a surface of the slider 205 facing the magnetic disk 11 has a first area 205w including the leading edge 201a of the writer 201 and a second area 205r including the leading edge 202a of the reader 202. A distance from the leading edge 202a of the reader 202 to the magnetic disk 11 will be referred to as a magnetic spacing ΔSP.

The writer heater 203 heats an area of the slider 205 in the vicinity of the writer 201 with power received from the power supply unit 24e (see FIG. 1) via the bias circuit 24a (see FIG. 1). Since the slider 205 is thermally deformed by this heating, the magnetic spacing ΔSP from the magnetic disk 11 in the vicinity of the writer 201 in the head slider 22 is changed in the vicinity of the writer 201.

The reader heater 204 heats an area of the slider 205 in the vicinity of the reader 202 with a power received from the power supply unit 24e via the bias circuit 24a. Since the slider 205 is thermally deformed by this heating, the magnetic spacing ΔSP from the magnetic disk 11 in the vicinity of the reader 202 in the head slider 22 is changed in the vicinity of the reader 202.

Referring back to FIG. 1, during the read operation, the head amplifier 24 amplifies a signal (read signal) read by the reader 202 from the magnetic disk 11 and outputs the amplified signal to the RDC 25. At this time, the CPU 26 performs a control such that a bias current flows from the power supply unit 24e to the reader 202 via the bias circuit 24a. The RDC 25 includes an auto gain control (AGC) circuit 25a, and performs an AGC control by using the AGC circuit 25a so as to amplify the signal (read signal) with a gain determined in the CPU 26 so that the level of the signal reaches a target level.

In addition, during the writing operation, the head amplifier 24 converts a write signal supplied from the RDC 25 into a write current, and outputs the write current to the writer 201.

In the magnetic disk device 1, in some cases, a dynamic fly height (DFH) control may be performed during the read operation and the write operation. In the DFH control, the CPU 26 supplies a power from the power supply unit 24e to the writer heater 203 and the reader heater 204 via the bias circuit 24a. That is, the CPU 26 supplies a DFH power from the power supply unit 24e to the writer heater 203 and the reader heater 204, which are mounted on the head slider 22, via the bias circuit 24a so as to thermally expand the head slider 22. This enables the magnetic spacing ΔSP to be adjusted.

Figure 4A:
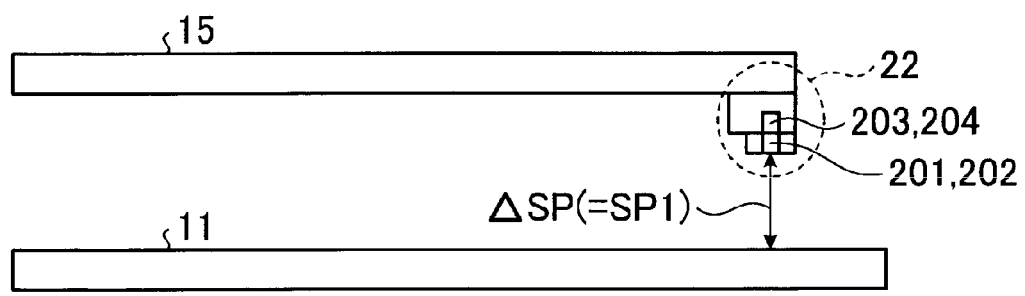
FIGS. 4A to 4C are side views illustrating DFH (Dynamic Fly Height) control and head-disk interface (HDI) in the embodiment.
Figure 4B:
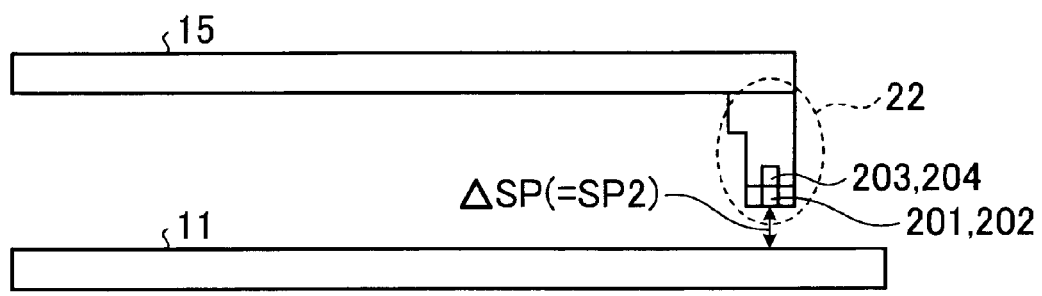

For example, the magnetic disk device 1 performs a control as illustrated in FIGS. 4A and 4B. FIGS. 4A and 4B are side views illustrating the actuator arm 15 and the head slider 22 when viewed from a lateral side, to explain the DFH control. In the head slider 22, the writer heater 203 and the reader heater 204 are mounted in the vicinity of the writer 201 and the reader 202, respectively. As illustrated in FIG. 1, the CPU 26 sends a power supply command to the power supply unit 24e. Upon receiving the power supply command, the power supply unit 24e supplies a power to the writer heater 203 and the reader heater 204 via the bias circuit 24a so as to heat the writer heater 203 and the reader heater 204. As illustrated in FIGS. 4A and 4B, as the slider 205 of the head slider 22 is thermally deformed by the heating, the magnetic spacing ΔSP may be reduced from SP1 to SP2 (<SP1).

In the write operation, when the distance (≈the magnetic spacing ΔSP) of the writer 201 from the magnetic disk 11 is reduced by the heating of the writer heater 203, a magnetic flux from the writer 201 strongly acts on the magnetic disk 11, which may improve write characteristics and decrease an error rate when written data are read, thereby achieving a high surface density on the magnetic disk 11.

In addition, during the read operation, when the distance (≈the magnetic spacing ΔSP) of the reader 202 from the magnetic disk 11 is reduced by the heating of the reader heater 204, a magnetic force of the magnetic disk 11 strongly acts on the reader 202, which may improve read characteristics and decrease an error rate of data and servo information in the read operation, thereby achieving a high surface density on the magnetic disk 11. In some cases, the magnetic spacing ΔSP controlled by the DFH control in this way may be called "back-off."

Figure 4C:
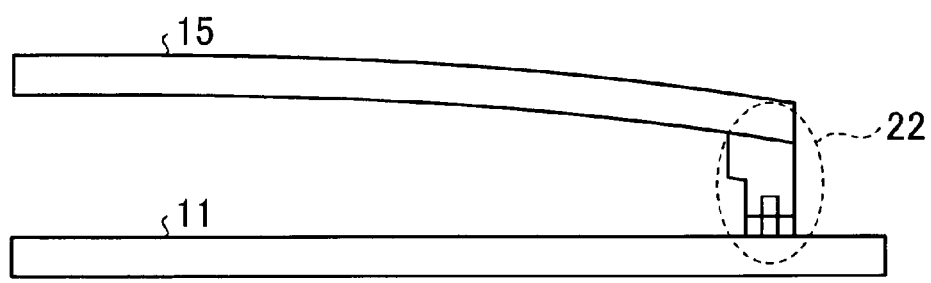

When the magnetic spacing ΔSP is reduced to SP2, as illustrated in FIG. 4C, because of an attractive force between the head slider 22 and the magnetic disk 11, head-disk interference (HDI) may occur by which the head slider 22 is attracted to the magnetic disk 11. FIG. 4C is a side view illustrating the actuator arm 15 and the head slider 22 when viewed from a lateral side, to explain the HDI. The attractive force between the head slider 22 and the magnetic disk 11 may include a variety of forces (e.g., an electrostatic attractive force, a Van Der Waals force, and a chemical adsorptive force) which may act between the head slider 22 and the magnetic disk 11. When the HDI frequently occurs because the magnetic spacing ΔSP becomes equal to about SP2, the rotation of the magnetic disk 11 may be hindered, and the magnetic disk 11 and the slider 205 may be physically damaged, which may make it difficult to properly perform the write operation or the read operation.

In order to prevent the occurrence of the HDI, lowering the power supplied to the writer heater 203 and the reader heater 204 may be considered in order to increase the magnetic spacing ΔSP from SP2 to SP3 (SP2<SP3<SP1).

However, when the magnetic spacing ΔSP is increased to SP3, there is an increased possibility that the read performance is deteriorated to cause an unrecovered read error or the write performance is deteriorated to cause a write error such as a weak write, although the occurrence of the HDI may be prevented.

Accordingly, in an embodiment, in the magnetic disk device 1 having the dual heater structure, the HDI is detected and the ratio and sum of powers supplied to the writer heater 203 and the reader heater 204 are controlled to prevent the occurrence of the HDI while making the magnetic spacing ΔSP closer to the target value SP2.

Specifically, upon detecting the HDI during the data write operation/read operation, the control unit 33 changes the ratio of the power supplied to the read heater 204 to the power supplied to the writer heater 203 (R/W heater power ratio) so as to make the HDI rarely occur. For example, an end surface projecting to a position closest to the magnetic disk 11 among the surfaces of the head slider 22 (slider 205) that face the magnetic disk 11 will be referred to as a "projecting end surface." The control unit 33 changes the R/W heater power ratio such that the area of the projecting end surface of the head slider 22 becomes narrower than the current area. At this time, there is a slight difference in the characteristics of power to be supplied and heating amount between the writer heater 203 and the reader heater 204. Even if the total power of the writer heater 203 and the reader heater 204 is constant, the total heating amount applied to the writer heater 203 and the reader heater 204 may change due to the change of the R/W heater power ratio and the magnetic spacing ΔSP may accordingly change. Therefore, in accordance with the changed R/W heater power ratio, the control unit 33 changes the total sum of the power to be supplied to the writer heater 203 and the power to be supplied to the reader heater 204 so as to make the distance (the magnetic spacing ΔSP) from the projecting end surface of the head slider 22 to the magnetic disk 11 approach to the target value SP2. The control unit 33 performs a read retry operation or a write retry operation in a state where the changes are made.

In order to detect the HDI, a parameter is required which is changed before and after the occurrence of the HDI. For example, the control unit 33 performs the DFH control to increase "TotalHP" (total heater power). However, at this time, the R/W heater power ratio is maintained. The "TotalHP" is a parameter indicating the total sum of the power to be supplied to the write heater 203 and the power to be supplied to the reader heater 204. For example, assuming that the power to be supplied to the write heater 203 is P203 and the power to be supplied to the reader heater 204 is P204, the following equation (1) is established.

$$TotalHP = P203 + P204 \quad (1)$$

Figure 5A:
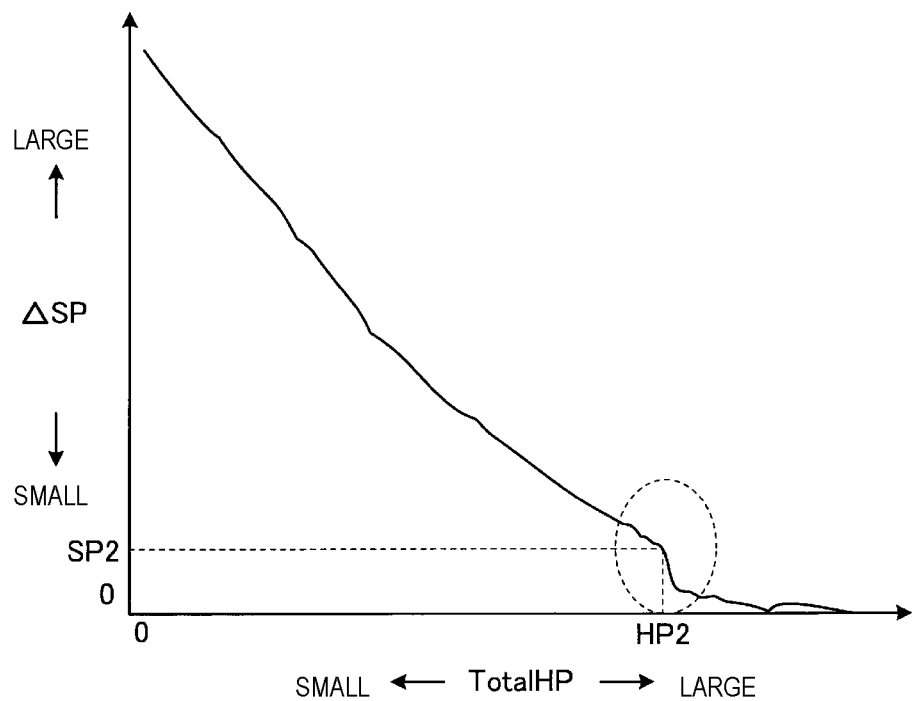
FIGS. 5A and 5B are views illustrating HDI during the DFH control.

In a case where the control unit 33 increases the "TotalHP," when TotalHP=HP2 and the magnetic spacing ΔSP becomes SP2 (for example, SP2=1.5 nm), the HDI occurs and the magnetic spacing ΔSP is rapidly decreased to approach to 0, as indicated by a broken line in FIG. 5A. That is, in the write operation/read operation, when the magnetic spacing ΔSP is maintained at a value SP2 suitable for an appropriate write operation/read operation, since the HDI is seen even when the magnetic spacing ΔSP is at SP2, it is considered that there is a possibility that the HDI may occur even during the write operation/read operation.

Figure 5B:
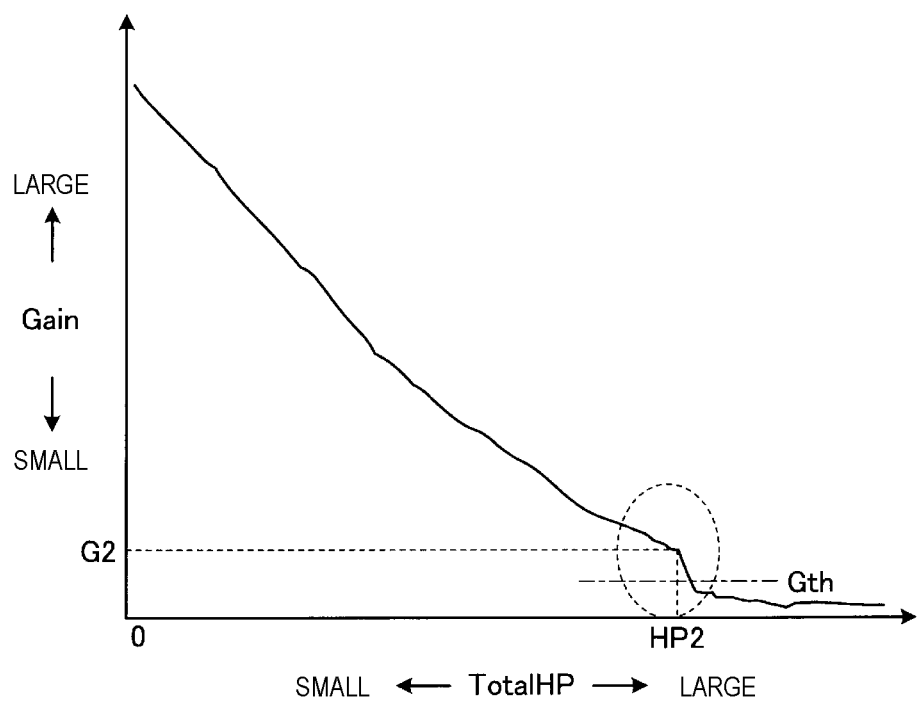

When the HDI occurs and the magnetic spacing ΔSP is rapidly decreased to approach to 0, since the level of the read signal read by the reader 202 from the magnetic disk 11 is rapidly increased, a gain of the AGC circuit 25a (see FIG. 1) at the time when the signal level is amplified to a target level is rapidly decreased to approach to 0, as indicated by a broken line in FIG. 5B. That is, since the gain of the AGC circuit 25a is changed with the change in the magnetic spacing ΔSP, it can be seen that the HDI can be detected by monitoring the gain of the AGC circuit 25a.

Figure 6:
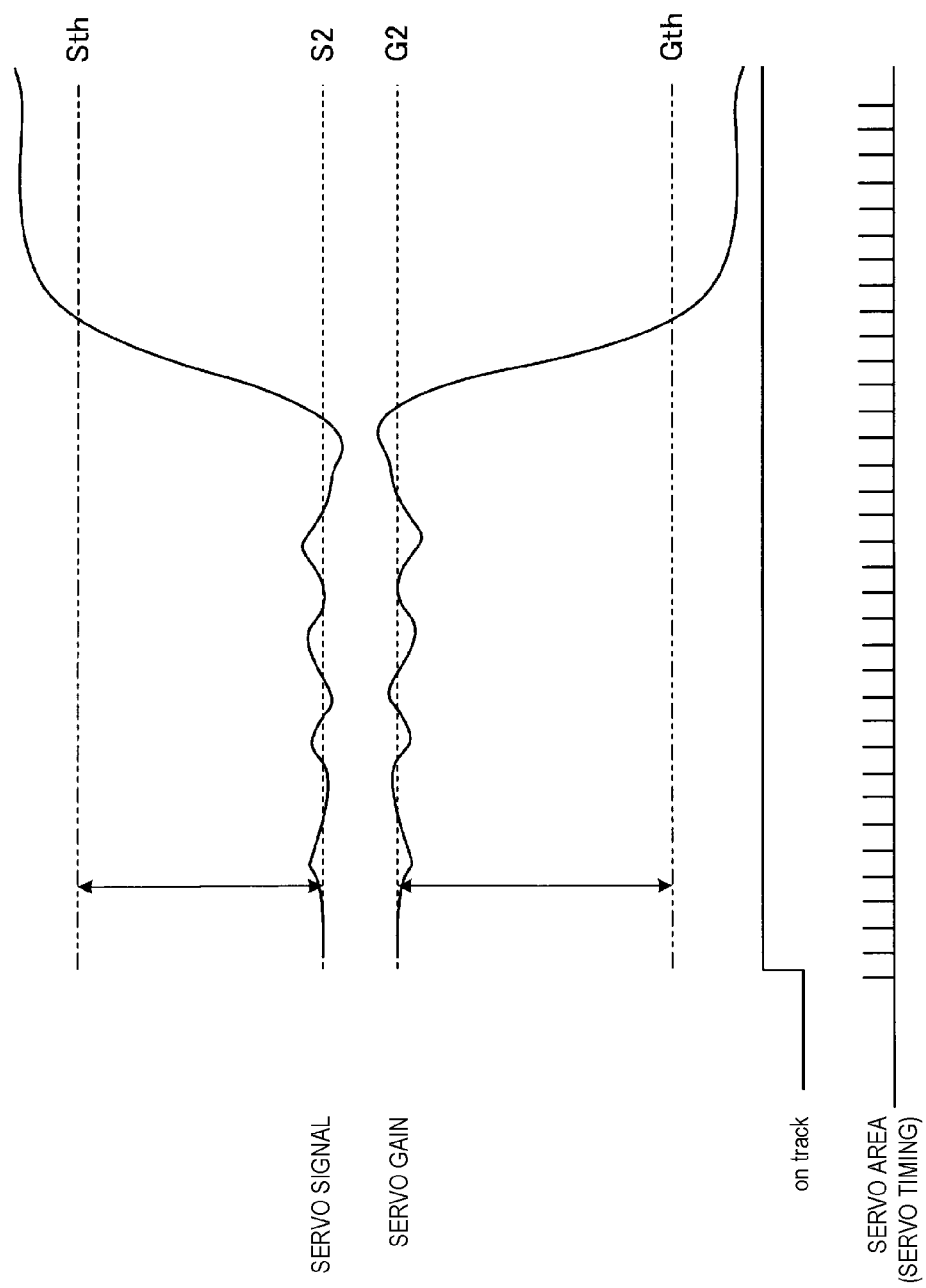
FIG. 6 is a view illustrating a detection of HDI in the embodiment.

For example, as illustrated in FIGS. 5B and 6, any gain between gain G2 and 0 when TotalHP=HP2 is set as a threshold value Gth in the control unit 33. This is equivalent to providing a slice level Sth higher than a level S2 of the read signal (servo signal) read from a servo area SV in each track when TotalHP=HP2. The slice level Sth is a value that is concerned with the read signal (servo signal) and corresponds to the threshold value Gth of the servo gain.

At this time, as illustrated in FIG. 6, the level of the servo signal becomes substantially constant (e.g., the level S2) when the magnetic spacing ΔSP is substantially constant, and is rapidly increased to exceed the slice level Sth when the magnetic spacing ΔSP is rapidly decreased to approach to 0. The gain of the AGC circuit 25a with respect to the servo signal (servo gain) becomes substantially constant (e.g., the gain G2) when the magnetic spacing ΔSP is substantially constant, and is rapidly decreased to be lower than the threshold value Gth when the magnetic spacing ΔSP is rapidly decreased to approach 0. Therefore, the HDI may be accurately detected by monitoring the servo gain of the AGC circuit 25a and comparing the servo gain with the threshold value Gth. That is, the servo gain may be used as a parameter for detecting the HDI.

For example, when the head slider 22 is servoed on a target track, the control unit 33 determines the gain of the AGC circuit 25a with respect to the servo signal at every servo timing at which the servo signal is read from the servo area SV of the target track. The control unit 33 compares the gain of the servo signal (servo gain) with the threshold value Gth at every servo timing. When the servo gain is larger than the threshold value Gth, the control unit 33 determines that the HDI does not occur. When the servo gain is smaller than the threshold value Gth, the control unit 33 determines that the HDI has occurred.

When it is determined that the HDI has occurred, the control unit 33 changes the "HPratio" (heater power ratio) [%] so that the HDI does not occur. The "HPratio" is a parameter representing the proportion of the power to be supplied to the reader heater 204 in TotalHP. For example, assuming that the power to be supplied to the writer heater 203 is P203 and the power to be supplied to the reader heater 204 is P204, the following equation (2) is established.

$$HPratio[\%] = \{P204/(TotalHP)\} \times 100 = \{P204/(P203+P204)\} \times 100 \quad (2)$$

In addition, the proportion of the power to be supplied to the writer heater 203 is expressed by the following equation (3)

$$1 - HPratio[\%] = 1 - \{P204/(TotalHP)\} \times 100 = \{P203/(P203+P204)\} \times 100 \quad (3)$$

Figure 7:
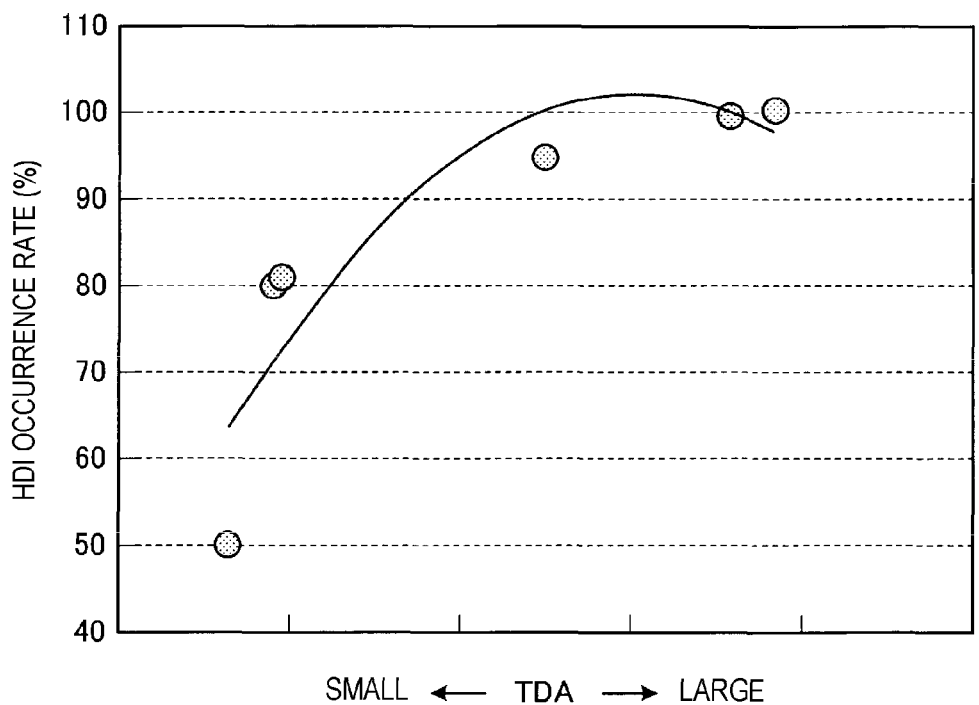
FIG. 7 is a graphical view illustrating a relationship between an area of a projecting end surface of the head slider and an occurrence rate of HDI in the embodiment.

The following description explains how to change the HPratio [%] so as not to cause HDI. A relationship between the area of the projecting end surface of the head slider 22 and the occurrence rate of the HDI is investigated to obtain a result illustrated in FIG. 7. FIG. 7 is a view illustrating the relationship between the area of the projecting end surface of the head slider 22 and the occurrence rate of the HDI. As illustrated in FIG. 7, as an area TDA of the projecting end surface of the head slider 22 is narrowed, the occurrence rate of the HDI tends to decrease. In order to make the HDI rarely occur, it is considered that the area TDA of the projecting end surface of the head slider 22 should be narrowed.

Figure 8:
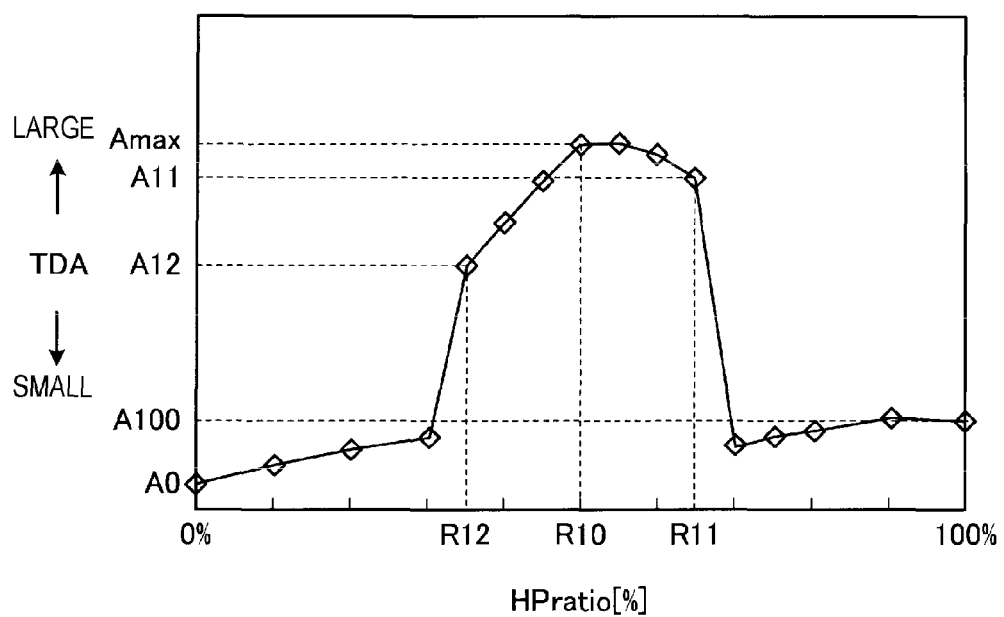
FIG. 8 is a graphical view illustrating a relationship between a ratio of heater powers and the area of the projecting end surface of the head slider in the embodiment.

It is considered that the area TDA of the projecting end surface of the head slider 22 is changed depending on the heating amount of the slider 205 by the writer heater 203 and the reader heater 204. A relationship between HPratio [%] and the area TDA of the projecting end surface is investigated to obtain a result represented in FIG. 8. As represented in FIG. 8, it has been found that the area TDA of the projecting end surface has the maximum value Amax when Hpratio=R10 (e.g., R10=about 50%), and the area TDA of the projecting end surface tend to decrease from the maximum value Amax when HPratio decreases from R10, and decrease from the maximum value Amax when HPratio increases from R10.

For example, the area TDA of the projecting end surface=A12 (<Amax) when Hpratio=R12 (<R10) and the area TDA of the projecting end surface=A0 (<A12) when Hpratio=0 (<R12). In addition, the area TDA of the projecting end surface=A11 (<Amax) when Hpratio=R11 (>R10) and the area TDA of the projecting end surface=A100 (<A11) when Hpratio=100 (>R11).

The relationship illustrated in FIG. 8 may be stored in a management information storage area of the magnetic disk 11 as first correspondence information in which the proportion of power for the writer heater 203 and the reader heater 204 and the area TDA of the projecting end surface are associated with each other. The control unit 33 may read the first correspondence information as illustrated in FIG. 8 from the management information storage area and determine a value of HPratio to be changed according to the first correspondence information. Here, the first correspondence information represented in FIG. 8 may be prepared for each concentric zone including the plurality of tracks of the magnetic disk 11.

When a change in the area TDA of the projecting end surface according to HPratio is expressed in terms of a relationship between the cross sectional shape and planar shape of the projecting end surface of the head slider 22, it is expressed as illustrated in FIGS. 9A to 9J. FIGS. 9A to 9E are views illustrating a relationship between HPratio and the sectional shape of the projecting end surface of the head slider 22. FIGS. 9F to 9J are views illustrating a relationship between HPratio and the planar shape of the projecting end surface of the head slider 22. At this time, in FIGS. 9A to 9J, TotalHP=HPmax. HPmax is an adjustment value of TotalHP corresponding to a value of HPratio at which the area TDA of the projecting end surface has the maximum value Amax such that the magnetic spacing ΔSP is substantially equal to the target value SP2 (in the case of FIGS. 8 and 10, the adjustment value of TotalHP corresponding to Hpratio=R10 where TDA=Amax)=HPmax).

Figure 9:
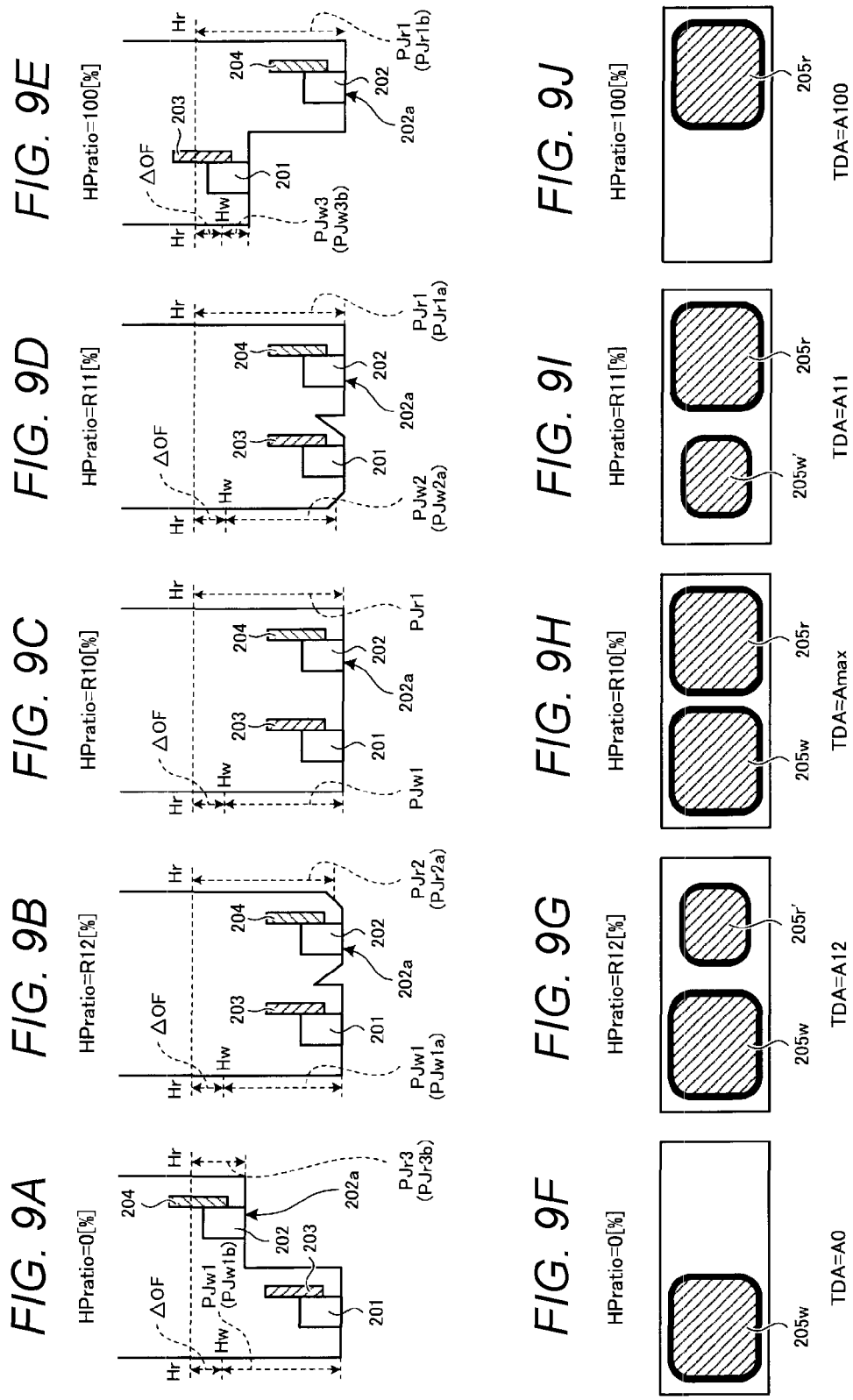
FIGS. 9A to 9J are views illustrating a relationship between the ratio of heater powers and a sectional shape of the projecting end surface of the head slider in the embodiment.

As illustrated in FIGS. 9C and 9H, when Hpratio=R10 (see FIG. 8) [%] (e.g., 500), the projection amount from the reference height position Hw in the vicinity of the writer 201 due to the heating of the writer heater 203 is PJw1 and the projection amount from the reference height position Hr in the vicinity of the reader 202 due to the heating of the reader heater 204 is PJr1 (≈PJw1+ΔOF). At this time, a combined area of the first area 205w and the second area 205r forms the projecting end surface such that the area TDA of the projecting end surface becomes the maximum value Amax.

As illustrated in FIGS. 9B and 9G, when Hpratio=R12 [%] (0<R12<R10), the projection amount in the vicinity of the writer 201 due to the heating of the writer heater 203 is PJw1a and the projection amount in the vicinity of the reader 202 due to the heating of the reader heater 204 is PJr2a (<PJw1a+ΔOF). At this time, a combined area of the first area 205w and a portion 205r' of the second area 205r forms the projecting end surface such that the area TDA of the projecting end surface becomes A12 (<Amax).

As illustrated in FIGS. 9A and 9F, when Hpratio=0 [%], the projection amount in the vicinity of the writer 201 due to the heating of the writer heater 203 is PJw1b and the projection amount in the vicinity of the reader 202 due to the heating of the reader heater 204 is PJr3b (<<PJw1b+ΔOF). At this time, the first area 205w forms the projecting end surface such that the area TDA of the projecting end surface becomes A0 (<A12).

As illustrated in FIGS. 9D and 9I, when Hpratio=R11 [%] (R10<R11<100), the projection amount in the vicinity of the reader 202 due to the heating of the reader heater 204 is PJr1a and the projection amount in the vicinity of the writer 201 due to the heating of the writer heater 203 is PJw2a (<PJr1a−ΔOF). At this time, a combined area of a portion 205w' of the first area 205w and the second area 205r forms the projecting end surface such that the area TDA of the projecting end surface becomes A11 (<Amax).

As illustrated in FIGS. 9E and 9J, when Hpratio=100 [%], the projection amount in the vicinity of the reader 202 due to the heating of the reader heater 204 is PJr1b and the projection amount in the vicinity of the writer 201 due to the heating of the writer heater 203 is PJw3b (<<PJr1b−ΔOF). At this time, the second area 205r forms the projecting end surface such that the area TDA of the projecting end surface becomes A100 (<A11).

In each of the conditions, there is a slight difference in the characteristics of a power to be supplied and heating amount between the writer heater 203 and the reader heater 204. Even if the total power of the writer heater 203 and the reader heater 204 is constant, the total heating amount by the writer heater 203 and the reader heater 204 may change due to the change of the R/W heater power ratio and the height position of the projecting end surface of the head slider 22 may accordingly change. That is, in accordance with the total power of the writer heater 203 and the reader heater 24 and the proportion of power supplied thereto, the magnetic spacing ΔSP from the leading edge 202a of the reader 202 of the head slider 22 to the magnetic disk 11 may change.

Figure 10:
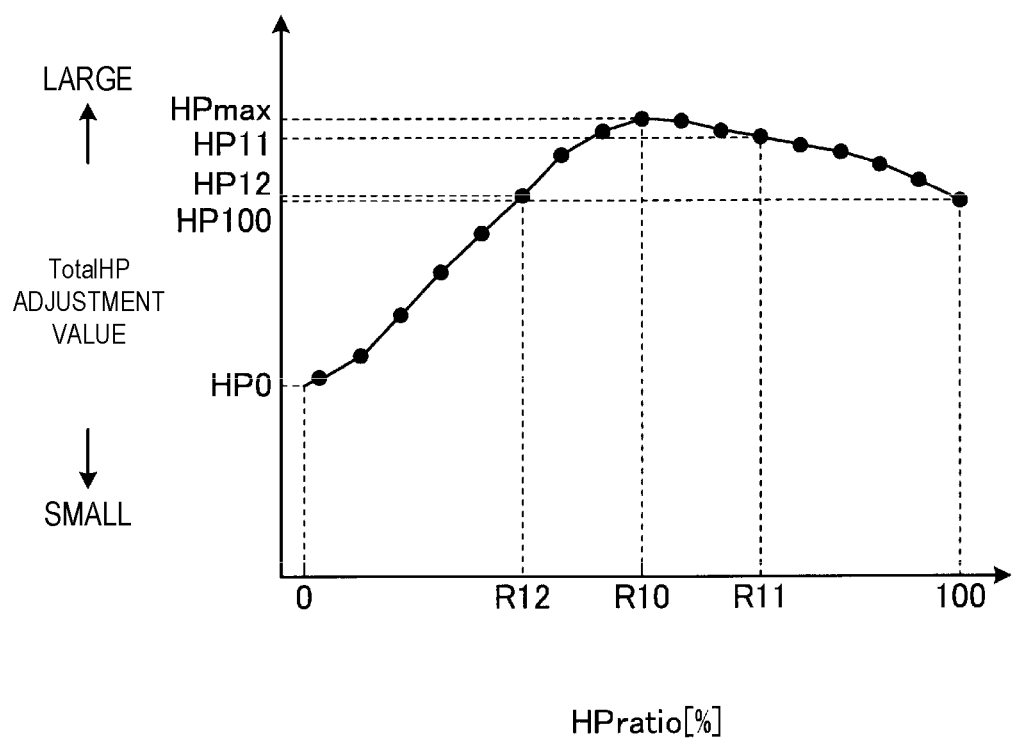
FIG. 10 is a graphical view illustrating a relationship between the ratio of heater powers and an adjustment value of a total sum of heater powers in the embodiment.

In order to stabilize the write performance and the read performance of the magnetic disk device 1, keeping the magnetic spacing ΔSP approximately equal to the target value SP2 may be considered. A relationship between HPratio [%] and the value of TotalHP at which the magnetic spacing ΔSP is substantially equal to the target value SP2 is reviewed to obtain a result illustrated in FIG. 10. FIG. 10 is a view illustrating a relationship between Hpratio [%] and an adjustment value of TotalHP at which the magnetic spacing ΔSP is substantially equal to the target value SP2. FIG. 10 may be regarded as a view illustrating a value of TotalHP to be adjusted for each HPratio [%]. As illustrated in FIG. 10, it has been found that there the adjustment value of TotalHP becomes the maximum value HPmax when HPratio=R10 (e.g., about 50%), and the adjustment value of TotalHP tends to decrease from the maximum value HPmax when HPratio decreases from R10, and decrease from the maximum value HPmax when HPratio increases from R10.

For example, the adjustment value of TotalHP=HP12 (<HPmax) when Hpratio=R12 (<R10) and the adjustment value of TotalHP=HP0 (<HP12) when HPratio=0 (<R12). In addition, the adjustment value of TotalHP=HP11 (<HPmax) when Hpratio=R11 (>R10) and the adjustment value of TotalHP=HP100 (<HP11) when Hpratio=100 (>R11).

The relationship illustrated in FIG. 10 may be stored in the management information storage area of the magnetic disk 11 as second correspondence information in which the proportion of power and the total sum of powers for the writer heater 203 and the reader heater 204 are associated with each other. The control unit 33 can read the second correspondence information as illustrated in FIG. 10 from the management information storage area and determine a value of TotalHP corresponding to the desired HPratio according to the second correspondence information. Incidentally, the second correspondence information illustrated in FIG. 10 may be prepared for each concentric zone including the plurality of tracks of the magnetic disk 11.

For example, when Hpratio=R12 [%] (0<R12<R10), the value of TotalHP is changed from HPmax to HP12. Thus, as illustrated in FIGS. 9B and 9G, the projection amount in the vicinity of the writer 201 due to the heating of the writer heater 203 is changed from PJw1a to PJw1 and the projection amount in the vicinity of the reader 202 due to the heating of the reader heater 204 is changed from PJr2a to PJr2. As a result, the height position of the projecting end surface becomes substantially equal to that when Hpratio=R10 [%] and accordingly the magnetic spacing ΔSP can be approximately equal to the target value SP2.

When Hpratio=0 [%], the value of TotalHP is changed from HPmax to HP0. Thus, as illustrated in FIGS. 9A and 9F, the projection amount in the vicinity of the writer 201 due to the heating of the writer heater 203 is changed from PJw1b to PJw1 and the projection amount in the vicinity of the reader 202 due to the heating of the reader heater 204 is changed from PJr3b to PJr3. As a result, the height position of the projecting end surface becomes substantially equal to that when Hpratio=R10 [%] and accordingly the magnetic spacing ΔSP may be approximately equal to the target value SP2.

When Hpratio=R11 [%] (R10<R11<100), the value of TotalHP is changed from HPmax to HP11. Thus, as illustrated in FIGS. 9D and 9I, the projection amount in the vicinity of the reader 202 due to the heating of the reader heater 204 is changed from PJr1a to PJr1 and the projection amount in the vicinity of the writer 201 due to the heating of the writer heater 203 is changed from PJw2a to PJw2. As a result, the height position of the projecting end surface becomes substantially equal to that when Hpratio=R10 [%] and accordingly the magnetic spacing ΔSP can be approximately equal to the target value SP2.

When Hpratio=100 [%], the value of TotalHP is changed from HPmax to HP100. Thus, as illustrated in FIGS. 9E and 9J, the projection amount in the vicinity of the reader 202 due to the heating of the reader heater 204 is changed from PJr1b to PJr1 and the projection amount in the vicinity of the writer 201 due to the heating of the writer heater 203 is changed from PJw3b to PJw3. As a result, the height position of the projecting end surface becomes substantially equal to that when Hpratio=R10 [%] and accordingly the magnetic spacing ΔSP may be approximately equal to the target value SP2.

Next, the operation of the magnetic disk device 1 will be described with reference to FIG. 11. FIG. 11 is a flow chart illustrating the operation of the magnetic disk device 1.

In the magnetic disk device 1, prior to the operation, the following four pieces of information INF1 to INF0 may be stored in the management information storage area of the magnetic disk 11.

INF1: information indicating a relationship between HPratio [%] and the area TDA of the projecting end surface of the head slider 22 (the first correspondence information illustrated in FIG. 8);

INF2: information indicating a relationship between HPratio [%] and an adjustment value of TotalHP at which the magnetic spacing ΔSP is approximately equal to the target value SP2 (the second correspondence information illustrated in FIG. 10);

INF3: allowable range of change, X, at the time HPratio is being changed, e.g., R10±X [%]; and INF4: allowable number of times Y of consecutive occurrence of HDI during retries.

Upon starting a write operation/read operation (S1), the magnetic disk device 1 detects whether or not a HDI has occurred while performing the write operation/read operation (S2). For example, when the servo gain is larger than the threshold value Gth, the control unit 33 determines that no HDI has occurred (No in S2). When the servo gain is smaller than the threshold value Gth, the control unit 33 determines that the HDI has occurred (Yes in S2). Alternatively, for example, when the read signal is lower than the slice level Sth, the control unit 33 determines that no HDI has occurred (No in S2). When the read signal is higher than the slice level Sth, the control unit 33 determines that the HDI has occurred (Yes in S2).

When it is determined that no HDI has occurred (No in S2), the control unit 33 waits until the next servo timing (see FIG. 6).

When it is determined that the HDI has occurred (Yes in S2), the control unit 33 pauses the write operation/read operation and changes HPratio [%] to prevent the occurrence of the HDI (S3). That is, the control unit 33 reads the information INF1 and INF3 from the management information storage area and determines a value of HPratio to be changed within the change allowable range R10±X [%] based on the first correspondence information illustrated in FIG. 8.

For example, when the current Hpratio=R10 and R10−X≤R12<R10<R11≤R10+X, the control unit 33 can change the value of HPratio from R10 to R11 (>R10) such that the area TDA of the projecting end surface is A11 which is smaller than the current value Amax, with reference to the first correspondence information illustrated in FIG. 8. Alternatively, the control unit 33 may change the value of HPratio from R10 to R12 (<R10) such that the area TDA of the projecting end surface is A12 which is smaller than the current value Amax, with reference to the first correspondence information illustrated in FIG. 8.

Then, according to the changed HPratio, the control unit 33 changes TotalHP such that the distance (the magnetic spacing ASP) from the projecting end surface of the head slider 22 to the magnetic disk 11 approaches to the target value SP2 (S4). That is, the control unit 33 reads the information INF2 from the management information storage area and determines an adjustment value of TotalHP corresponding to the changed HPratio based on the second correspondence information illustrated in FIG. 10.

For example, when the current TotalHP=HPmax and the changed Hpratio=R11, the control unit 33 changes the value of TotalHP from HPmax to HP11 such that the magnetic spacing ASP approaches to the target value SP2, with reference to the second correspondence information illustrated in FIG. 10. Alternatively, when the current TotalHP=HPmax and the changed Hpratio=R12, the control unit 33 changes the value of TotalHP from HPmax to HP12 such that the magnetic spacing ΔSP approaches the target value SP2, with reference to the second correspondence information illustrated in FIG. 10.

While performing a write retry operation/read retry operation in a state where the change in S3 and S4 is made (S5), the magnetic disk device 1 detects the occurrence of HDI (S6). For example, when the servo gain is larger than the threshold value Gth, the control unit 33 determines that no HDI has occurred (No in S6). When the servo gain is smaller than the threshold value Gth, the control unit 33 determines that the HDI has occurred (Yes in S6). Alternatively, for example, when the read signal is lower than the slice level Sth, the control unit 33 determines that no HDI has occurred (No in S6). When the read signal is higher than the slice level Sth, the control unit 33 determines that the HDI has occurred (Yes in S6).

When it is determined that no HDI has occurred (No in S6), the control unit 33 continues to perform the write operation/read operation (S7) and ends the process after the completion of the write retry operation/read retry operation.

When it is determined that the HDI has occurred (Yes in S6), the control unit 33 determines whether or not the number of times of consecutive occurrence of HDI exceeds the allowable number of times Y (the allowable number of times of consecutive occurrence of HDI during retries) (S8). That is, the control unit 33 includes a counter (not illustrated) and counts up a count value of the counter when it is detected in S6 that the HDI has occurred. The control unit 33 reads the information INF0 from the management information storage area and compares the count value of the counter with the allowable number of times Y.

When the count value of the counter is equal to or less than the allowable number of times Y (No in S8), the control unit 33 changes HPratio to a different value (S3), accordingly changes the value of TotalHP (S4), and again performs the write retry operation/read retry operation (S5).

When the count value of the counter exceeds the allowable number of times Y (Yes in S8), the control unit 33 determines that there is no room to test other HPratio values and other TotalHP values, informs the host of an error of "device NG" due to the HDI (S9), and ends the process.

As described above, in the above-described embodiments, in the magnetic disk device 1, upon detecting the HDI during the data write operation/read operation, the control unit 33 changes the ratio of power supplied to the read heater 204 to power supplied to the writer heater 203 (R/W heater power ratio) so as to prevent the occurrence of the HDI. Then, in accordance with the changed R/W heater power ratio, the control unit 33 changes the total sum of the power to be supplied to the writer heater 203 and the power to be supplied to the reader heater 204 so as to make the distance (the magnetic spacing ΔSP) from the projecting end surface 202a of the reader 202 in the head slider 22 to the magnetic disk 11 approach the target value SP2. This enables to prevent the occurrence of HDI while making the magnetic spacing ΔSP approach the target value SP2. As a result, because the occurrence of HDI may be prevented while the write performance/read performance of the magnetic disk device 1 is maintained excellent, the performance of the magnetic disk device 1 can be stabilized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device, comprising:
   a magnetic disk;
   a head slider including a read element, a write element, a first heater arranged nearer to the read element than the write element, and a second heater arranged nearer to the write element than the read element; and
   a control circuit configured to change a ratio of powers supplied to the first heater and the second heater to adjust a first spacing between the read element and the magnetic disk and a second spacing between the write element and the magnetic disk,
   wherein the control circuit is configured to change a total sum of powers supplied to the first heater and the second heater upon changing the ratio.

2. The device according to claim 1, wherein the control circuit is configured to change the ratio upon detecting a state of head-disk interference (HDI).

3. The device according to claim 2, wherein the control circuit is configured to change the ratio and the total sum of powers supplied to the first heater and the second heater upon detecting the state of HDI.

4. The device according to claim 3, wherein the control circuit is configured to access data that associates each ratio in a plurality of different ratios with a different total sum of powers for the first heater and the second heater, and to change the total sum of powers to the one corresponding to the ratio in the accessed data.

5. The device according to claim 3, further comprising:
   a read channel configured to amplify a read signal generated by the read element by a gain so that the read signal reaches a target level, wherein
   the state of HDI is detected when the gain becomes lower than a threshold value.

6. The device according to claim 1, wherein the control circuit is configured to change the ratio such that an area of an end surface of the head slider facing the magnetic disk is made smaller.

7. The device according to claim 1, wherein the control circuit is configured to change the ratio and perform a read retry operation or a write retry operation upon detecting a state of head-disk interference (HDI) while performing a read operation or a write operation.

8. The device according to claim 1, wherein the control circuit is configured to change the ratio and perform a read retry operation or a write retry operation, up to a maximum number of times after detecting a state of head-disk interference (HDI) while performing the read retry operation or the write retry operation.

9. A magnetic disk device, comprising:
   a magnetic disk;
   a head slider including a read head that faces the magnetic disk during operation, a write head that faces the magnetic disk during the operation, a first heater arranged nearer to the read head than the write head, and a second heater arranged nearer to the write head than the read head; and a control circuit configured to change a ratio of powers supplied to the first heater and the second heater when a read signal generated by the read head reaches a level higher than a slice level while a read operation or a write operation is being performed.

10. The device according to claim 9, wherein the control circuit is configured to change the ratio and a total sum of powers supplied to the first heater and the second heater when the read signal reaches the level higher than the slice level.

11. The device according to claim 9, wherein the control circuit is configured to change the ratio such that an area of an end surface of the head slider facing the magnetic disk is made smaller.

12. The device according to claim 9, wherein the control circuit is configured to change the ratio and perform a read retry operation or a write retry operation when the read signal reaches the level higher than the slice level.

13. The device according to claim 9, wherein the control circuit is configured to change the ratio and perform a read retry operation or a write retry operation up to a maximum number of times, until the read signal reaches a level lower than the slice level.

14. A control method of a magnetic disk device including a magnetic disk, a head slider including a read element, a write element, a first heater arranged nearer to the read element than the write element, and a second heater arranged nearer to the write element than the read element, the control method comprising:
    detecting a state of head-disk interference (HDI);
    changing a ratio of powers supplied to the first heater and the second heater upon detecting the state to adjust a first spacing between the read element and the magnetic disk and a second spacing between the write element and the magnetic disk and
    changing a total sum of powers supplied to the first heater and the second heater upon changing the ratio.

15. The control method according to claim 14, wherein the changing of the ratio causes an area of an end surface of the head slider facing the magnetic disk to become smaller.

16. The control method according to claim 14, wherein the total sum of powers is changed such that a distance from an end surface of the head slider to the magnetic disk becomes equal to a target distance.

17. The control method according to claim 14, further comprising:
    performing a read operation or a write operation after the ratio of powers has been changed.

18. The control method according to claim 14, further comprising:
    detecting the state of HDI during a read retry operation or a write retry operation;
    further changing the ratio again upon detecting the state of HDI again; and
    performing another read retry operation or the write retry operation after the ratio is further changed.

\* \* \* \* \*